UNITED STATES PATENT OFFICE.

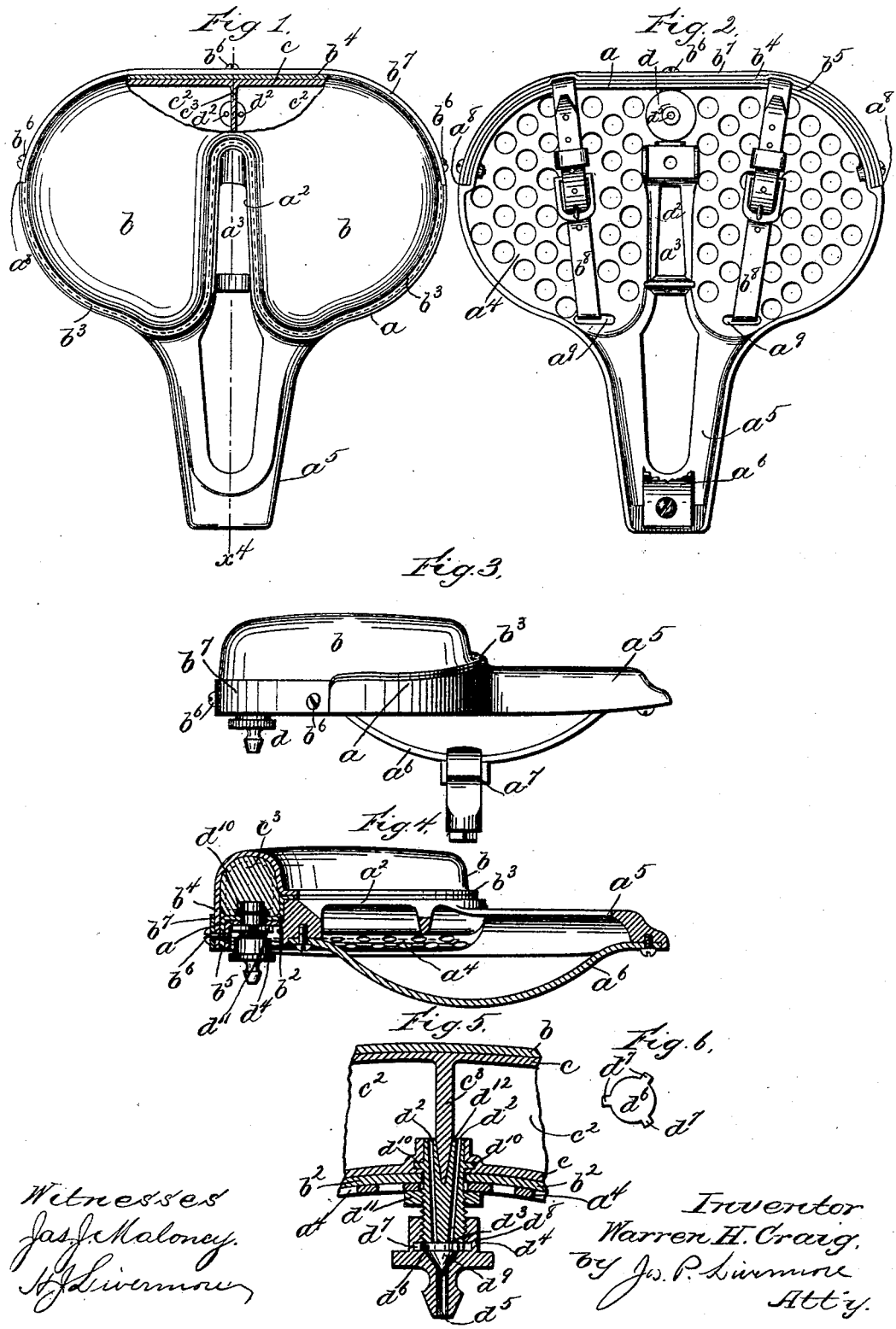

WARREN H. CRAIG, OF LAWRENCE, MASSACHUSETTS.

BICYCLE-SADDLE.

SPECIFICATION forming part of Letters Patent No. 602,732, dated April 19, 1898.

Application filed August 26, 1895. Serial No. 560,514. (No model.)

*To all whom it may concern:*

Be it known that I, WARREN H. CRAIG, of Lawrence, county of Essex, State of Massachusetts, have invented an Improvement in Bicycle-Saddles, of which the following description, in connection with the accompanying drawings, is a specification, like letters on the drawings representing like parts.

The present invention relates to a bicycle-saddle, and is embodied in a saddle having a narrow forward extension or horn which may for convenience be called the "steering" portion, for the reason that it serves only as a guide to aid the rider in keeping a middle position upon the saddle, and a seat portion of sufficient width to afford a proper support for the rider, the said seat portion being at the rear of the said horn and having its surface materially above the level of that of the horn, so that no part of the rider's person where any of its weight is supported can come in contact with the said horn.

The invention is shown as embodied in a saddle having other novel features of construction and arrangement, the horn being herein shown as formed integral with a supporting-frame, the seat-supporting portion of which has a peripheral supporting-wall and a web filling in the space inclosed by the said wall, upon which web is supported a suitable cushion, the surface of which is wholly above that of the frame and the forward projection and of such shape as to form a comfortable seat for the sole support of the rider.

The invention further consists in an improved pneumatic cushion adapted to be used in connection with the saddle above described, the said cushion preferably comprising two air-chambers of resilient material, such as rubber, one at each side of the longitudinal axis of the saddle, being herein shown as separated from each other by an air-tight partition and provided with an inflating-valve or pump-nipple in communication with both chambers, so that air may be pumped into both chambers simultaneously from a single source, thus insuring a practical equality in inflation in the two chambers. The cushion is thus made in two similar parts, preferably with a greater portion of each separate from the other, so as to leave an open space between them lengthwise of the saddle; but they may be, as shown, connected by a neck at the rear of the saddle, in which neck is the partition which separates the two chambers and into which is inserted the double valve above described, one outlet being at one side and the other on the other side of the said partition. Thus the formation is practically that of two separate cushions, one at each side of the main portion of the saddle, the said cushions forming practically the entire seat portion of the saddle, no other part of which is in contact with the rider, the frame, however, being provided with the usual horn or "steering" projection, as it may be called, which is mainly for the purpose of guiding the rider, so to speak, to the proper middle position on the seat, the surface of which is wholly above that of the steering projection and which supports the entire weight of the rider, the said projection also serving to coöpeate with the forward end of a supporting-spring adapted to be secured to the seat-post of the bicycle. The said horn is preferably made with a central longitudinal opening continuous with the space between the two side portions of the supporting-frame, thus forming a ventilating-space extending rearward to a point near the back of the saddle.

The cushion portions which may obviously consist of any suitable yielding material, preferably comprising, however, the air-chambers above described, are contained in a casing, preferably of leather, conforming in shape to the periphery of the supporting-frame, so as to practically cover the same, a portion of the said casing being left open for the insertion of the cushion, the edges of the casing at the said opening being extended into flaps overlapping each other and a portion of the frame to which they are then secured, thus closing the opening and securing or partially securing the cushion to the frame, straps also being preferably provided, as will be described.

Figure 1 is a top plan view, partly in section, of a saddle embodying the present invention; Fig. 2, an underneath plan view of the same; Fig. 3, a side elevation; Fig. 4, a section on line $x^4$, Fig. 1; Fig. 5, an enlarged section through that portion of the cushion which contains the valve and through the valve itself, and Fig. 6 a plan view of the valve-washer.

The cushion-support or rigid body portion of the saddle is preferably a single piece of metal, aluminium being especially suitable for the purpose, and comprises a frame $a$, extending around the periphery of the main seat portion of the saddle and having an inwardly-extending loop or bend $a^2$ from the front to a point near the rear of said seat portion, thus affording a central opening or space $a^3$ to afford a ventilating-space and give the desired shape to the seat portion. Extending across the seat portion and connecting the inner sides of the frame $a$ is a web $a^4$, preferably consisting of a perforated-metal portion integral with the said frame, upon which web the cushion is adapted to be supported. Extending from the forward part of the said frame is the horn or steering projection $a^5$, also preferably made with a central opening continuous with the opening $a^3$ between the two sides of the portion $a^2$ of the frame $a$, the purpose of said horn being to afford a lateral guide for the rider as well as to strengthen the frame and to afford a supporting-point for the front end of the usual bow-spring $a^6$, which is connected at its other end to the rear portion of the frame and provided with a suitable clip or other fastening device $a^7$ for attachment to the seat-post. The cushion or cushions, preferably consisting of air-chambers, which will be hereinafter described, are supported upon the web within the frame and are contained in a casing preferably consisting, as shown, of a leather receptacle having upper and lower walls or members $b$ and $b^2$, respectively, conforming in shape to the periphery of the frame $a$, the said members being molded and sewed together along the front and side edges, thus forming the seam $b^3$, overlying the upper edge of the frame $a$, which at the front and sides extends somewhat above the surface of the web, thus laterly engaging and confining the lower portion of the said casing, the upper portion of which projects wholly above the frame and entire rigid part of the saddle. The rear edges of said upper and lower portions of the casing are disconnected and extended downward to form flaps $b^4$ and $b^5$, respectively, which may be separated for the insertion of the cushions, but which are adapted to overlap, so as to close the rear end of the casing after the cushion is inserted, the said overlapping portion then being carried downward, as shown in Fig. 4, and connected, as by screws $b^6$, to the rear portion of the wall $a$. A band $b^7$, of metal or any other suitable material, is preferably applied to the outside of said flaps, as shown, and the screws inserted through said band, which thus affords a seat for the heads of the screws and at the same time adds to the appearance of the saddle.

As best shown in Fig. 2, the frame $a$ is preferably shouldered at the points $a^8$ on the side of the saddle, and between said points is not extended above the web, so as to admit of the flap being turned down over the said frame, as best shown in Fig. 4. The shouldered portions are substantially equal in width to the thickness of the superimposed flaps, so that when said flaps are turned down and secured the outer periphery of the saddle will be substantially even, as shown. To secure the forward part of the cushion to the frame, straps $b^8$ are preferably employed, said straps extending from the front of the lower portion $b^2$ and from the inner side of the outer flap $b^4$, the former passing around the end of the frame and the latter through an opening $a^9$ in the web, said parts being buckled together, as clearly shown in Fig. 2.

The pneumatic cushion $c$ is embodied preferably, as shown, in a single receptacle of rubber also shaped to conform to the shape of the frame and adapted to be inserted in the outer casing, the said receptacle, however, being divided into two chambers $c^2$, one at each side of the longitudinal middle line of the saddle. The two chambers are separate, being herein shown as formed in a single outer portion having a neck or narrow connecting portion and a partition $c^3$, extending across the same, and are adapted to be inflated by a valve $d$, having two passages $d^2$, one opening into one chamber and the other into the other chamber. Both these inlet-openings communicate with a valve common to both and are connected through said valve to a common duct, through which the saddle is to be inflated, the valve being arranged to open or close both passages at the same operation.

The preferred construction of the valve is shown in Fig. 6 and is embodied in a stem portion or nipple having two passages $d^2$, both communicating with a common seat $d^3$ and adapted to be closed simultaneously by the valve $d^4$, which is threaded on the said stem and capable of longitudinal movement with relation thereto. The said valve consists of a cup-shaped portion having a duct $d^5$, within the mouth of which is supported a washer $d^6$, adapted to be seated upon the valve-seat $d^3$, and thus to close the valve. The said washer is provided with fingers $d^7$ at the periphery thereof, the said fingers extending into an undercut recess $d^8$ within the portion $d^4$, so that when the said portion is unscrewed from the stem it will withdraw the washer from the seat $d^3$, thus opening the mouths of the outlet-ducts $d^2$. The said washer is mounted on a support $d^9$, consisting, preferably, of a cone engaging with the periphery of the outlet portion of the duct $d^5$, so as to be engaged thereby when the part $d^4$ is screwed on the stem, thus carrying the washer $d^6$ up into engagement with the valve-seat $d^3$. When, however, the valve is opened, by unscrewing the part $d^4$ it is obvious that air forced from the duct $d^5$ will lift the cone sufficiently to pass by the same and thence around the washer $d^6$ to the outlet-ducts $d^2$. The upper portion of the stem is provided with a flange $d^{10}$, fitting an annular recess in the rubber walls of the chambers $c^2$, and a nut $d^{11}$ is threaded on the valve-stem and adapted to screw toward the under side of the saddle frame or web after the cushion is in place.

In that portion of the stem which extends into the chambers is formed a groove or space $d^{12}$, into which extends in accordance with the construction herein shown the partition $c^3$, which divides the two chambers from each other. Thus when the valve is opened for inflation the inlet thereof is connected with the two outlets, one for each chamber, so that both will be inflated from the common source of pressure, the inflation thus being practically the same in each side of the seat.

While the specific construction herein shown and described is desirable and practicable to afford a saddle having a seat portion the surface of which is materially above that of the horn or steering projection, so that the rider is supported wholly independently of said horn, it is not intended to limit the invention to such specific construction, since obvious modifications may be made without departing from the invention.

I claim—

1. A bicycle-saddle having a forward extension or steering portion and a seat portion at the rear of said steering portion, the surface of said seat portion being substantially above the surface of the steering portion to wholly support the weight of the rider and constitute the entire seat portion of the saddle, substantially as described.

2. A bicycle-saddle having a forward extension or steering portion and a seat portion at the rear of said steering portion, the surface of said seat portion being substantially above the surface of the steering portion to wholly support the weight of the rider and constitute the entire seat portion of the saddle, and a longitudinal space or opening along the middle of said seat portion extending rearward from the steering portion, substantially as described.

3. A bicycle-saddle comprising a rigid supporting-frame having a forward extension or horn to constitute a steering projection or guide, and a cushion-supporting portion of suitable shape to constitute a seat, and a cushion or pad supported thereon, and having its surface substantially above that of the horn, whereby the weight of the rider is wholly supported upon the surface of said cushion above said extension, substantially as described.

4. The combination of the main supporting-frame provided with an opening extending rearward into the body of the frame, and a web within said frame, and a horn extending forward therefrom, said frame projecting above said web at the front portion and being wholly below said web at the rear portion of the saddle, with a cushion supported on said web corresponding in shape with and bounded by said frame and provided with a flap overlapping and secured to the rear portion of the frame, substantially as described.

In testimony whereof I have signed my name to this specification in the presence of two subscribing witnesses.

WARREN H. CRAIG.

Witnesses:
 JOS. P. LIVERMORE,
 M. E. HILL.